United States Patent [19]
Rifkin

[11] 3,796,367
[45] Mar. 12, 1974

[54] CONTROL VALVE FOR USE IN AN AIR DISTRIBUTION UNIT

[75] Inventor: Ernest Rifkin, De Witt, N.Y.

[73] Assignee: Carrier Corporaton, Syracuse, N.Y.

[22] Filed: Oct. 2, 1972

[21] Appl. No.: 294,430

[52] U.S. Cl. .................................. 236/49, 98/40 D
[51] Int. Cl. .............................................. F24f 3/02
[58] Field of Search .......... 236/49, 80, 87; 98/40 D

[56] References Cited
UNITED STATES PATENTS

| 3,434,409 | 3/1969 | Fragnito | 236/49 |
| 3,167,253 | 1/1965 | Church et al. | 236/80 |
| 3,452,928 | 7/1969 | Stark | 236/87 |
| 3,212,710 | 10/1965 | Niles | 236/87 |

*Primary Examiner*—William E. Wayner
*Assistant Examiner*—William E. Tapolcai, Jr.
*Attorney, Agent, or Firm*—Barry E. Deutsch

[57] ABSTRACT

A control valve for use in an air distribution unit for discharging conditioned air into an area to be treated, including a variable volume control chamber for regulating the volume of conditioned air supplied to the area. The control valve regulates the operation of the variable volume control chamber to maintain a substantially constant discharge of conditioned air into the area irrespective of changes in supply air pressure. The control valve includes first and second variable orifices in series with each other. The size of the second orifice is varied so a predetermined ratio between the area of the first orifice and the area of the second orifice is obtained so a desired control pressure may be communicated from the control valve to the variable volume control chamber of the distribution unit.

3 Claims, 4 Drawing Figures

CONTROL VALVE FOR USE IN AN AIR DISTRIBUTION UNIT

BACKGROUND OF THE INVENTION

This invention relates to a control valve employed with an air distribution unit for discharging conditioned air from an air conditioning system. More particularly, this invention relates to a control valve which may be readily calibrated so a predetermined constant quantity of air flow is delivered from the distribution unit, regardless of variations in supply duct pressure.

In United States Letters Patent No. 3,167,253, there is disclosed an air distribution unit operable to provide a relatively constant supply of conditioned air to a room or similar area in a multi-story structure, such as an office in an office building. The air distribution unit disclosed therein includes a pressure responsive mechanism or control valve associated therewith for maintaining a substantially constant quantity of air discharged from said unit, regardless of changes in the supply duct pressure. The pressure responsive mechanism allows slight variations in the discharged air quantity in response to room temperature variations as sensed by a bleed type thermostat.

Distribution units of the type disclosed in the aforecited United States patent have become a commercial success due to their reliability and relative inexpensive installation costs. As is obvious, the pressure responsive mechanism is a critical component of such air distribution unit. In particular, such control device must be capable of regulating the operation of the air distribution unit so a constant predetermined quantity of air flow is provided therefrom, regardless of variations in the supply duct pressure.

A suitable pressure responsive control valve or mechanism is illustrated in United States Letters Patent No. 3,434,409, issued Mar. 25, 1969 in the name of Daniel A. Fragnito and assigned to the same assignee as the present application. As noted hereinbefore, such pressure responsive control valve must perform in a highly reliable manner to thereby regulate the supply of conditioned air from a distribution unit so the desired quantity thereof is obtained. Hence, such pressure responsive control device must be accurately calibrated since it is required to perform over a relatively large range of variable air supply quantities.

Heretofore, the calibration of such control valves has been a relatively expensive and time consuming procedure. In addition, the calibration thereof has not always been as accurate as desired.

For example, with particular reference to the control valve disclosed in the aforecited U.S. Pat. No. 3,434,409, it has been the practice to position the variable orifice of the valve by suitably adjusting the orifice adjusting means, so a given value of control pressure is obtained in the control chamber of the distribution unit for a given value of pressure in the supply duct.

When the desired control pressure is obtained, the corresponding location of the variable orifice is indicated, for example by a scribed line on the variable orifice adjusting means. A flow label is then affixed to the adjusting means. Indicia thereon indicate the quantity of air which may be discharged from the distribution unit. The particular air quantity indicium corresponding to the control chamber pressure is aligned with the scribed line on the adjusting means. As is obvious, this procedure is time consuming, relatively expensive due to the labor involved, and may cause inaccuracies due to the transfer step involved in aligning the flow label with the scribed line.

SUMMARY OF THE INVENTION

It is therefore an object of this invention to provide a control valve which may be accurately calibrated.

It is a further object of this invention to provide a control valve which can be accurately and reliably calibrated in a relatively short period of time and at a minimal cost.

It is yet another object of this invention to provide an air distribution unit, including a control valve, the unit being operable to supply a predetermined quantity of conditioned air into an area.

These and other objects of the invention are obtained by providing a control valve having first and second variable orifices in series with each other. Adjustable means is associated with the second orifice to vary the size thereof. A predetermined ratio between the area of the first orifice and the area of the second orifice is thus established to thereby obtain a desired control pressure within a variable volume control chamber which is operable to regulate the discharge of air from the air distribution unit.

DESCRIPTION OF THE PREFERRED EMBODIMENT

Figure 1:
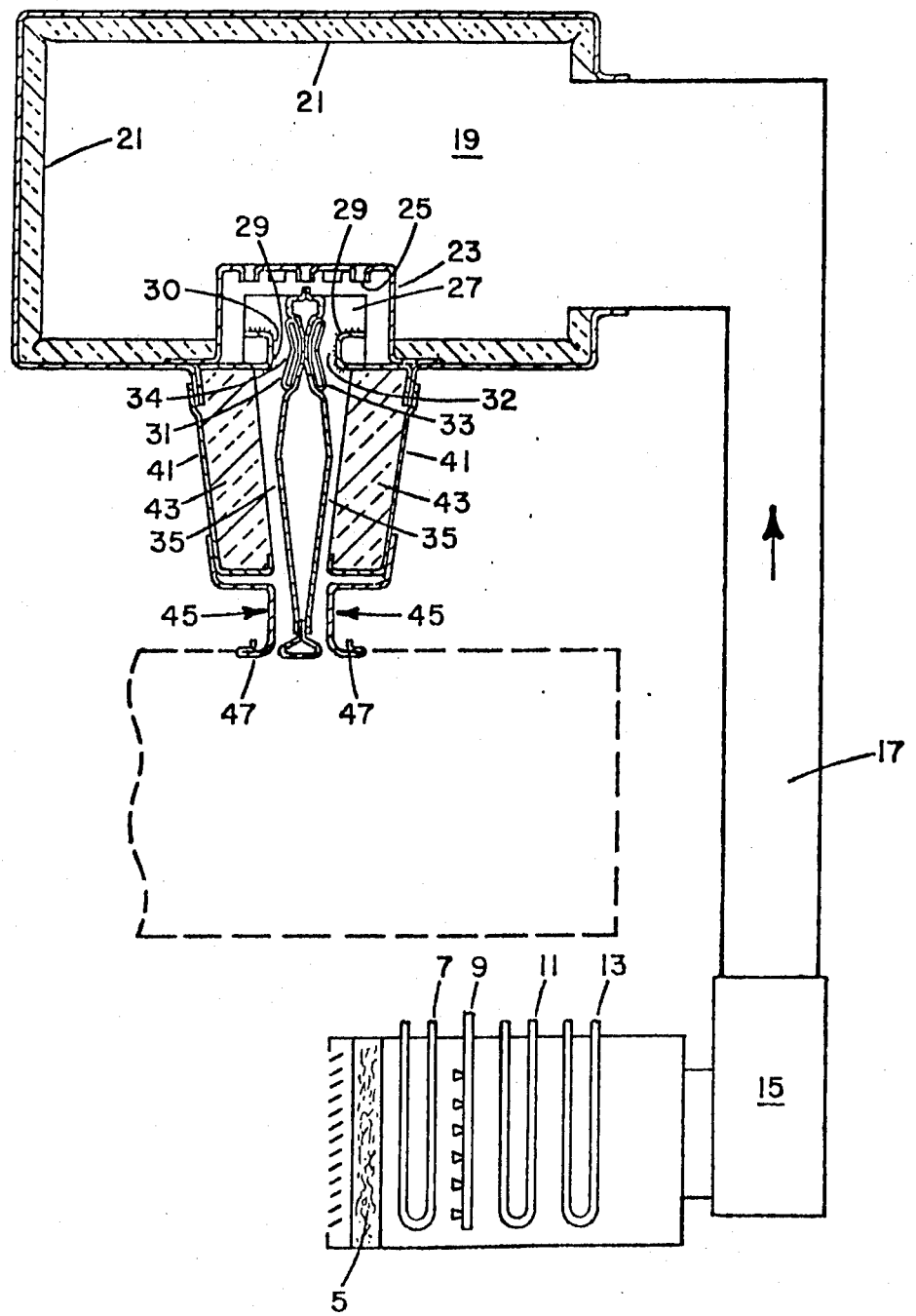
FIG. 1 is a schematic view of a portion of an air conditioning system illustrating in section an air distribution unit of the type to which the present invention relates.

Referring more particularly to the drawings, there is illustrated a central air conditioning apparatus including a filter 5, pre-cooling coil 7, spray means 9, cooling coil 11, heating coil 13 and a fan 15, for heating, cooling, humidifying and filtering the air as desired, to provide conditioned air for passage to the area being conditioned. A supply air duct 17 is illustrative of the plurality of ducts provided to supply conditioned air to ceiling air terminals throughout the building.

The ceiling terminal includes a primary chamber 19 lined with a sound absorbing material 21 such as a glass fiber blanket. The primary chamber is ordinarily open at both ends for connecting a series of terminals end to end to provide a complete air discharge system. Suitable end pieces (not shown) are utilized to cap the end terminals in the series. An air supply distribution plate 23 having a plurality of collared opening 25 therein is provided to evenly distribute supply air from primary chamber 19 into distribution chamber 27 which is defined by the top and side walls of distribution plate 23. To provide an optimum air discharge pattern, the air supplied to the distribution chamber from the primary chamber should have minimal non-vertical velocity components. Since the air supplied to the ceiling terminal is ordinarily introduced horizontally into the end or side of the terminal, there is a large horizontal velocity component to the air stream within the primary chamber. The distribution plate employing a large number of collared openings is very effective in providing an efficient non-turbulent vertical diversion of the air stream from primary chamber 19 into distribution chamber 27. This minimizes noise generation within the terminal. The collars divert the horizontal velocity component of the air stream so the velocity components of the air stream within distribution chamber 27 are vertical. For an optimum air discharge pattern from the plate, the depth of the collar should approximate the diameter of the collared opening. The depth of each collar is constant throughout the entire circumference thereof to provide a discharge opening parallel to the plane of the distribution plate. In discharging air from an opening, the geometry of the opening itself may have a tendency to effect an attachment of the air stream to a portion of the wall defining the opening. This attachment can cause the air stream to be diverted in a direction away from the axis of the opening. By providing a collar having a constant depth throughout its circumference, an abrupt detachment of the air stream therefrom is obtained which minimizes the tendency of the air stream to flow in a non-vertical direction within the distribution chamber.

The bottom of distribution chamber 27 includes aligned cut-off plates 29 which are provided with a curved surface 30 for engagement by bladders 31 and 33 to form a damper or control chamber. The curved surfaces smooth the flow of air through the damper to minimize the pressure drop therethrough when the bladder is fully deflated and provide a low noise level over the entire operating range of the terminal as bladder inflation is varied between a fully deflated position and a fully inflated position. The surface 30 is covered with felt 32 to further minimize noise.

By varying the inflation of the bladders, the area of the openings between the bladders and the cut-off plates may be varied. This feature can be utilized to provide a variety of modes of terminal operation. If it is desired to maintain a constant discharge of air from the terminal, a pressure responsive control may be employed to inflate the bladders in response to supply air pressure to reduce the area between the bladders and cut-off plates as duct pressure increases and to increase the area therebetween as duct pressure decreases. If it is desirable to control the terminal to provide a constant room temperature under varying cooling loads, the bladder inflation may be controlled by a thermostat responsive to room temperature to provide an increased quantity of air flow from the terminal as the cooling load increases and a decreased quantity of air flow from the terminal as the cooling load decreases.

The bladders 31 and 33 are adhesively mounted on a central partition assembly comprised of opposed generally convex plates 35, diffuser triangle 37 and control module 39. The plates have a v-shaped recess therein so the bladders are completely recessed within the plates when deflated. This provides a large area between the active walls 34 of the bladders and the cut-off plates for maximum air flow therebetween. Further, the recessed bladder provides a smooth surface along the plate 35 to minimize air turbulence.

The damper mechanism is disposed a substantial distance upstream from the discharge openings in the terminal to provide sufficient space therebetween to absorb any noise generated by the damper mechanism. For maximum sound absorption, downwardly extending walls 41 which form air passages in conjunction with plates 35 are lined with the sound absorbing material such as glass fiber blankets 43. Outlet members 45 having outwardly flared lower portions 47 thereon are affixed, as by welding, to the walls 41.

Figure 2:
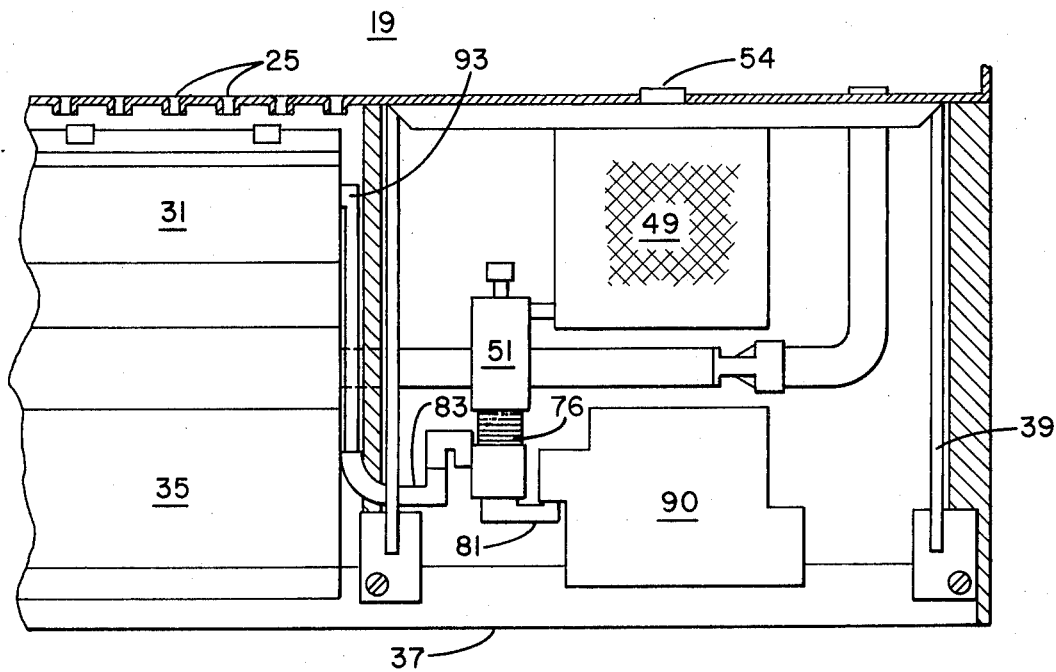
FIG. 2 is a partial side elevational view of the air distribution unit.

The air terminal includes a damper control module assembly illustrated in FIG. 2. The module assembly includes convex plates 35, bladders 31 and 33, and a control module 39 mounted on triangular diffuser member 37. The control module comprises filter 49, pressure regulator 51, and thermostat 90. Filter 49 is provided with an opening 54 in the top surface thereof for communication with primary chamber 19. Filtered air from filter 49 is supplied to pressure regulator 51. Controlled air from pressure regulator 51 is supplied to thermostat 90 and to bladders 31 and 33. The control module may be provided with two filters, two regulators, and two thermostats, if it is desirable to control bladders 31 and 33 independently. This may be desirable when the air terminal is disposed above a room partition for individual temperature control on either side of the partition.

Figure 3:
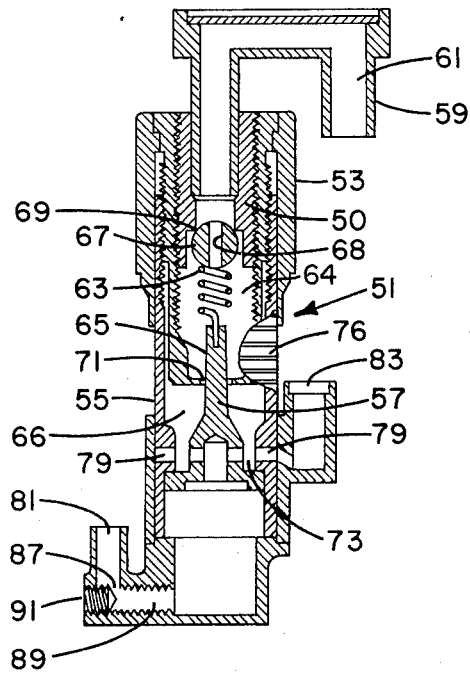
FIG. 3 is a sectional view of the control valve of the present invention as employed in the air distribution unit illustrated in FIG. 1.

Referring now in particular to FIG. 3, there is disclosed a sectional view of an embodiment of pressure regulator 51 in accordance with the present invention. The control valve or pressure regulator 51 employed with the air distributing unit has a top section 50, an upper cylindrical section 53, a lower cylindrical section 55, and a bottom section 57. Threads are provided on sections 50, 53, and 55 to allow adjustment of the relative positions therebetween for reasons to be hereinafter explained. A connector or cap 59 having a passageway 61 therethrough for passage of air from plenum chamber 19, via opening 54 and filter 49, to the interior of control valve 51, is provided for attachment to top section 50. A spring 63 affixed to tapered post 65 of bottom section 57 is provided for biasing a relief ball 67 against seat 69 formed in top section 50. Spring 63 is disposed in a first chamber 64 of the valve. Relief ball 67 has an orifice 68 provided therethrough.

Upper cylindrical section 53 is provided with an orifice 71 which, in conjunction with tapered post 65 define a first variable orifice means, which functions to regulate the flow of controlled air therethrough. Post 65 is disposed in a second chamber 66 of the valve. Vertical passageway 73 and horizontal passageways 79 are provided in bottom section 57 for passage of controlled air into ducts 81 and 83. Second variable orifice means 87 disposed between vertical passageway 73 and duct 81 is provided for a reason to be more fully explained hereinafter. Air from duct 83 is provided to variable volume control chamber 31 through line 93.

As may be seen by reference to FIG. 3, spring pressure on relief ball 67 may be adjusted by altering the relative position of bottom section 57 and top section 50. Air flow through orifice 71 may be regulated by altering the relative positions of upper cylindrical section 53 and bottom section 57.

Control valve or pressure regulator 51 is designed to maintain a relatively constant air flow through the air distribution unit. However, to obtain a more fully regulated room temperature, it may be necessary to vary the flow of conditioned air from the distribution unit in response to a change in the heating or cooling load encountered in the area or room served by the unit. To provide such temperature responsive regulation, air from duct 81 may be supplied to a bleed type thermostat 90. Thermostat 90 operates to vary the air bled through orifice means 87, and thus varies the pressure supplied to the control chamber, in turn causing the quantity of air discharged from the unit to range slightly below the set quantity.

Figure 4:
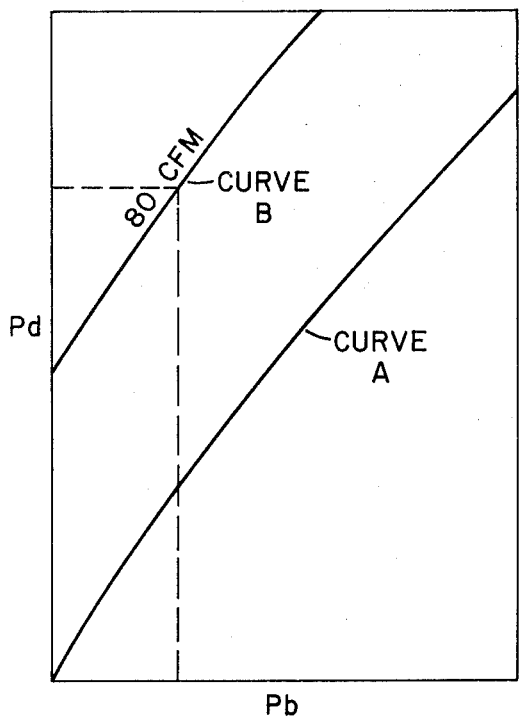
FIG. 4 graphically illustrates the operation of the control mechanism illustrated in FIG. 3.

Referring now to FIG. 4, the manner in which the control valve operates to maintain a substantially constant discharge of air from the distribution unit, irrespective of variations in supply duct pressure, will be explained. Valve 51 is a device that when calibrated, produces an intermediate pressure in duct 93 which is proportional in magnitude to the air pressure in primary chamber 19. Any variation of pressure in duct 83 results in a variation of the magnitude of pressure in chamber or bladder 31. Thus, by regulating the control signal to bladder 31 in direct proportion to variations in duct pressure, valve 51 operates to maintain a substantially constant air discharge. The changes in control pressure operating in bladders 31 and 33 provide a slot width necessary to produce the desired constant discharge of air, irrespective of variations in the pressure of the air supplied to the unit. In particular, curve A of FIG. 4 represents the operating characteristic of the air distribution unit wherein a specific quantity of conditioned air, for example 80 cubic feet per minute, is to be discharged, irrespective of changes in supply duct pressure. The axis labeled Pd represents the pressure in the duct, and similarly, the axis labeled Pb represents the pressure in the control chambers or bladders. Thus, as the pressure in the duct increases, the pressure in the control chamber simultaneously increases. Curve B of FIG. 4 represents the operating characteristics of the unit with relief ball 67 provided in top section 50. The curve indicates that, exclusive of the air passing through orifice 68, a minimum predetermined duct pressure is required before any control air will pass through the valve to control chambers 31 and 33. As is obvious, the control valve must be accurately calibrated so the desired relationship between variations in duct pressure and variations in the control chamber pressure are maintained so as to deliver a relatively constant volume of air from the air distribution unit. As noted previously, heretofore, such calibration has been time consuming and costly, and in addition, has not been as accurate as desired.

As discussed hereinabove, the pressure supplied through duct 93 to bladders 31 and 33 is proportional to the pressure in the primary chamber. The pressure in the intermediate control chamber is determined by the ratio of the areas between the first variable orifice means, and second variable orifice means 87. Variable orifice means 87 includes opening 89 and means, such as screw 91, to vary the size of the opening.

When it is desired to assemble and calibrate control valve 51, the following steps are performed. A flow label 76 having suitable indicia provided thereon, indicative of various quantities of air which may be obtained from the air distribution unit, is affixed at a predetermined location on the lower cylindrical section 55. Lower cylindrical section 55 forms a part of the adjusting means for varying the size of first orifice 71. A source of pressure (Pd) is applied to end cap 59 to transmit a known pressure signal through the control valve into the second chamber thereof. Upper cylindrical section 53 is then adjusted so it is aligned with a predetermined indicium on the flow label. This determines the area of the first orifice. However, due to tolerances in the various parts, the actual size of the area when section 53 is adjusted in the manner described above, will vary from control valve to control valve. The control pressure, (Pb) to be transmitted from the control valve to control chambers 31, and 33 corresponding to the desired quantity of air to be dischrged from the unit and the original pressure signal (Pd), is of a known magnitude. The screw or other appropriate adjusting means 91 is suitably moved to vary the size of second or bleed opening 89 to regulate the passage of air through such bleed opening. Correspondingly, the pressure signal transmitted through duct 93 to control chambers 31 and 33 is thereby regulated so it is at a desired magnitude. Thus, the required control pressure (Pb) to obtain the quantity of air desired from the unit is readily obtained by merely varying the size of opening 89. This in effect changes the ratio between the area of the first variable opening and the area of the second variable opening. As noted before, this ratio determines the magnitude of the control pressure signal transmitted to the control chambers.

Since the individual indicium on the flow label are at fixed positions relative to each other, no additional steps are required in calibrating the control valve; the valve is accurately calibrated so that various quantities of air within the operating range of the valve will be delivered from the distribution unit as the same are desired. Thereafter, screw 91 is firmly affixed in position and calibration of the control valve is completed. As is obvious, this procedure is relatively simple and may be performed at a minimal cost. In addition, the procedure is also extremely accurate.

Subsequent to the actual calibration process, ball 67 is inserted into top section 50. As noted before, the ball is provided to prevent flow of air through control valve 51 until a minimum duct pressure (Pd) is obtained. Curve B of FIG. 4 represents a typical air quantity curve for the control valve after the ball has been inserted.

Although, I have described and illustrated a preferred embodiment of my invention, my invention should not be limited thereto, but may be otherwise embodied within the scope of the following claims:

I claim:

1. In combination with a control valve for use in an air distributing unit having a control chamber, the control valve including a first chamber and a second chamber therein, pressure relief means associated with the first chamber to prevent flow of control air therein below a desired pressure, and a duct communicating the control valve with the air distributing unit control chamber, the improvement which comprises:
   first variable orifice means disposed between the first and second chambers;
   second orifice means in series with said first variable orifice means; and
   adjustable means associated with said second orifice means to vary the size thereof to provide a predetermined ratio between the area of said first orifice means and the area of said second orifice means to thereby obtain a desired control pressure in said duct communicating said control valve and said air distributing unit control chamber.

2. In combination with an air distributing unit for discharging conditioned air into an area to be conditioned, a plenum chamber, said plenum chamber being adapted to be placed in communication with the source of conditioned air at a desired pressure, means defining an outlet from said plenum chamber into the area to be treated, and a variable volume control chamber for regulating the quantity of conditioned air supplied to the area to be treated through the outlet, the improvement which comprises:

- a control valve having a first chamber and a second chamber therein, the first chamber communicating with the plenum chamber and the second chamber communicating with the variable volume control chamber;
- pressure relief means associated with the first chamber to prevent flow of air therein below a desired minimum pressure;
- first variable orifice means disposed between the first and second chambers;
- second orifice means in series with said first variable orifice means for exhausting control air from said second chamber;
- a control air pressure duct disposed between said first and second orifice means means to communicate the pressure in the second chamber to the variable volume control chamber to regulate the discharge of air from the air distribution unit; and
- adjustable means associated with said second orifice means to vary the size thereof to provide a predetermined ratio between the area of said first orifice means and the area of said second orifice means to thereby obtain a desired control pressure in said control air pressure duct for a given value of conditioned air supply pressure.

3. The method of calibrating a control valve of a type employed with an air distributing unit having a control chamber, the control valve beng operable to maintain a substantially constant discharge of conditioned air from the unit, regardless of variations in the conditioned air supply pressure, a portion of the control valve having a flow label affixed thereon, comprising the steps of:

a. connecting the control valve inlet to a source of supply air, the pressure thereof being of a known magnitude;

b. adjusting the position of a portion of the control valve so it is aligned with a desired indicium on the flow label to thereby adjust the opening of a first variable orifice;

c. supplying the known magnitude pressure signal through the first variable orifice into an intermediate chamber of the control valve;

c. regulating the bleeding of air from the intermediate chamber so a desired pressure is obtained therein, said pressure being related to the known supply air pressure; and e. communicating the intermediate chamber with the distributing unit control chamber so a pressure signal indicative of the pressure in the intermediate chamber is supplied to the control chamber, said pressure signal being operable to regulate the control chamber so a desired quantity of conditioned air is discharged from the unit.

* * * * *